United States Patent [19]
Rinne

[11] Patent Number: 5,987,063
[45] Date of Patent: Nov. 16, 1999

[54] METHOD FOR COMPENSATING CHANNEL ERRORS IN A DIGITAL DATA COMMUNICATION SYSTEM

[75] Inventor: Jukka Rinne, Tampere, Finland

[73] Assignee: Nokia Technology GmbH, Pforzheim, Germany

[21] Appl. No.: 08/815,963

[22] Filed: Mar. 13, 1997

[30]   Foreign Application Priority Data

Mar. 13, 1996 [FI] Finland .................................... 961164

[51] Int. Cl.⁶ .............................. H04Q 1/20; H04B 1/10
[52] U.S. Cl. .......................... 375/226; 375/260; 375/340; 375/349
[58] Field of Search ..................... 375/266, 285, 375/340, 260, 371, 373, 326, 349, 226; 370/464, 480

[56]   References Cited

U.S. PATENT DOCUMENTS

| | | |
|---|---|---|
| 5,233,632 | 8/1993 | Baum et al. ............................ 375/344 |
| 5,771,224 | 6/1998 | Seki et al. .............................. 370/206 |
| 5,838,734 | 11/1998 | Wright .................................... 375/316 |

*Primary Examiner*—Amanda T. Le
*Attorney, Agent, or Firm*—Ware, Fressola, Van Der Sluys & Adolphson LLP

[57]   ABSTRACT

The invention relates to a method for compensating channel errors in digital data communication in a signal in sampled data form. The method evaluates the phase error of the examined sample on the basis of the phase errors of at least two preceding samples, the estimate being used to compensate the phase error of the examined sample ($y_m(n)$).

15 Claims, 3 Drawing Sheets

METHOD FOR COMPENSATING CHANNEL ERRORS IN A DIGITAL DATA COMMUNICATION SYSTEM

BACKGROUND OF THE INVENTION

1. Field of the Invention

The invention relates to a method for compensating channel errors in digital data communication of a signal in sampled data form, such as errors, phase noise and frequency offset caused by multipath propagation in a digital data communication system, especially an OFDM system (Orthogonal Frequency Division Multiplexing).

2. Discussion of Related Prior Art

In this disclosure channel stands for a transmission path used in data transmission, which usually is a radiopath in wireless data transmission systems.

In wireless airborne data transmission, the signal will always be distorted to some extent in practice when passing from the transmitter to the receiver. Distortions are caused among other things by buildings, woods and meteorological variations. Moreover, as the receiver and/or the transmitter moves, the conditions will change constantly, thus affecting flawless signal reception. In practice, a signal reaches the receiver along a number of paths, and thus the distances covered by the signals following different paths will not be equally long, generating phase and amplitude differences between the signals. Imperfect oscillators also entail phase errors, for instance.

The OFDM system uses several subcarrier wave frequencies, allowing several signals to be transmitted at the same time. Each signal $X_m$ serves to modulate one subcarrier wave. The modulated subcarrier waves are combined and transformed into a mode suitable to be transmitted on the transmission path. In the receiver, demodulation is carried out, separating the transmitted signals to various receiving channels. One known OFDM modulator can be formed by using Inverse Discrete Fourier Transformation (IDFT), and accordingly, an OFDM demodulator can be formed with Discrete Fourier Transformation (DFT). FIG. 1 illustrates the principle of the OFDM system as a schematic block diagram. In FIG. 1 the channel block represents a transmission path, such as a radiopath, and then h(n) represents n transfer functions of the channel.

Prior art methods for compensating linear channel distortions are based on linear equalizers. In the OFDM system linear equalization is most frequently performed in the frequency domain owing to the nature of the OFDM system. Prior art methods are mainly based on minimizing the mean square error (MSE) of received and sent samples. To achieve this, adaptive algorithms are used, such as the least mean square (LMS) principle. Another option is to use a zero forcing (ZF) criterion in the frequency domain combined with a proportional algorithm (PA), which in practice provides faster convergence and also easier selection of the learning constant than adopting the MSE criterion in connection with an LMS algorithm.

Both the previously known methods mentioned above use the same type of method for compensating received and demultiplexed samples. The received samples are demultiplexed with Discrete Fourier Transformation (DFT), i.e. by transforming the received samples from time domain to the frequency domain, and subsequently the samples are multiplied with complex numbers, which are adjusted to the algorithm applied.

A known method that improves the compensation of constant phase errors uses minimum mean square error to estimate phase offset. This enables the frequency offset to be calculated and tuned to the oscillators.

The problem of LMS and PA algorithms is that when a small error is aimed at, the algorithms converge slowly. Then the algorithms are unable to follow fast variations in the channel characteristics. This causes problems especially regarding relatively long OFDM symbols, in which a phase change may be notable even during one single symbol duration.

BRIEF SUMMARY OF THE INVENTION

The purpose of the present invention is to eliminate the above drawbacks and to achieve a method and a device for compensating errors caused among others by multipath propagation, phase noise and frequency. Therefore, according to a first aspect of the present invention, a method for compensating channel errors in digital data communication of a signal in sampled data form comprises the steps of estimating the phase error of an examined sample, at least on the basis of the phase errors of two preceding samples for providing an estimate, and using said estimate for compensating the phase error of the examined sample.

The inventive idea is that a linear channel distortion is compensated by first adopting the minimum MSE criterion and the LSM algorithm. The mean phase rotation can be calculated on the basis of channel distortion-compensated signals and estimates corresponding to real values. After this the calculated mean phase rotation is used for the two preceding symbols, and then the phase error can be estimated with linear approximation in the symbol examined. The phase error being known, the phase noise of the symbol can be compensated in the time domain by inverse phase rotation.

The present method achieves appreciable advantages over prior art methods. With the use of the method of the invention, phase noise can be compensated far more effectively than with currently known methods. In addition, the method of the invention allows compensation of larger frequency offsets than known methods. The method of the invention can be implemented fully digitally, preferably in an application program of the receiver, and then no changes to the high frequency end of the receiver be called for. These and other objects, features and advantages of the present invention will become more apparent in light of the detailed description of a best mode embodiment thereof, as illustrated in the accompanying drawing.

BRIEF DESCRIPTION OF THE DRAWINGS

The invention will be described in greater detail below, with reference to the accompanying drawings, of which

DETAILED DESCRIPTION OF THE INVENTION

Figure 1:
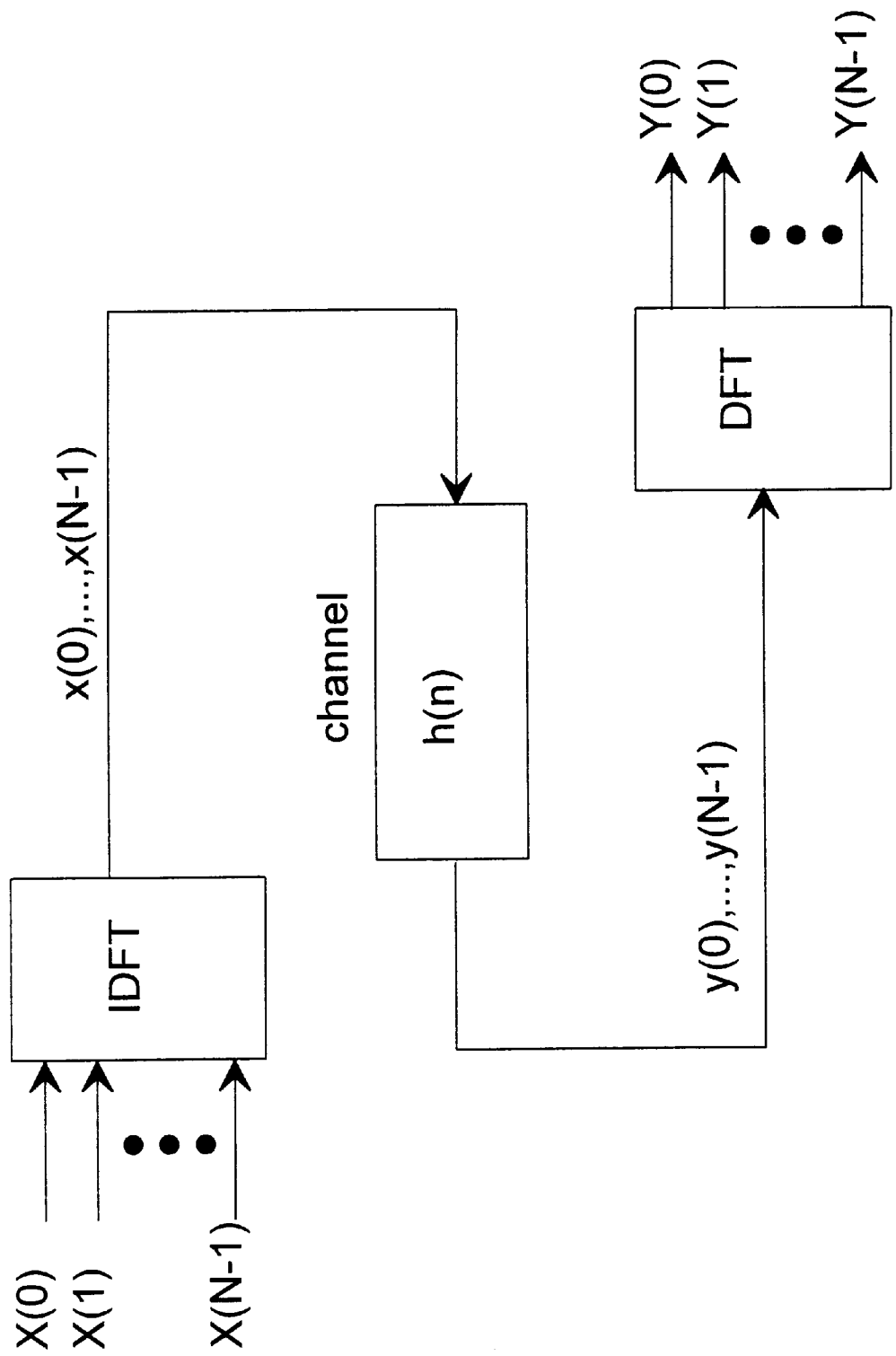
FIG. 1 illustrates the OFDM system as a basic block diagram.

Currently known compensating methods are not adequate for compensating errors arising in time-variant communication channels. In such channels frequency offset and phase noise will occur. A slowly changing phase error causes a common carrier phase error, which can be estimated. The use of the phase error estimate in the two preceding samples $Y_{m-1}$, $Y_{m-2}$ allows a linear curve to be fitted to these and to determine the phase error on the basis of this in sample $y_m$ to be received, and thus linear components in the phase noise can be compensated.

The method of the invention is examined below from a mathematical point of view exemplified by an ODFM signal $x_m(n)$, which is conducted over a channel, in which a phase error and multipath propagation are generated in signal $x_m(n)$. The oscillator noise is marked with the term $z_m(n)$, and it is assumed that the oscillator noise phase alone varies and the amplitude is constant, i.e.

$$z_m(n) = e^{i\phi_m(n)} \quad \text{(formula 1)}$$

If the OFDM symbol $x_m(n)$ is relatively long, i.e. the phase varies notably during one symbol duration, the phase error must be compensated.

In a time-invariant multipath channel the channel response $h_m(n)$ can be given in the form $$h_m(n) = \sum_{\lambda=0}^{\gamma-1} a(\lambda)\delta(n-\lambda) = h(n), \, a(\lambda) \in C \quad \text{(formula 2)}$$

$$\delta(\alpha) = \begin{cases} 1, & \text{when } \alpha = 0 \\ 0, & \text{otherwise,} \end{cases}$$

where $\Gamma$ is the number of multipath propagated components and C denotes a set of complex numbers.

Assuming that the noise generated after down converting is neglectable, the received samples $y_m(n)$ are then given by $$y_m(n) = (x_m(n)*h(n) + d_m(n))z_m(n) \quad \text{(formula 3)}$$

where * denotes convolution.

The compensation of received samples $y_m(n)$ is done in two separate steps. In the first step, the linear part of the phase error is compensated in time domain the with the time compensation term $t_{m,n}$, giving the phase compensated sample $$\tilde{y}_m(n) = y_m(n)t_{m,n} \quad \text{(formula 4)}$$

In the second step, compensation is done in the frequency domain with the frequency coefficient $C_m(k)$, the frequency compensated sample being given by the formula $$\tilde{X}_m(k) = \tilde{Y}_m(k)C_m(k) \quad \text{(formula 5)}$$

where $$\tilde{Y}_m(k) = DFT\{\tilde{y}_m(n)\} = \frac{1}{N}\sum_{n=0}^{N-1}\tilde{y}_m(n)e^{-i2\pi nk/N} \quad \text{(formula 6)}$$

The output of the equalizer is obtained on the basis of samples $\tilde{X}_m(k)$, i.e. with the decision function $P[\tilde{X}_m(k)]$.

As the value of the frequency compensated sample $\tilde{X}_m(k)$ given by formula 5 may lie between the symbol values adopted in the system, the next corresponding value is selected among the symbol values available. This is known as such in discrete systems.

The frequency compensating coefficients $C_m(k)$ are iteratively solved with an LMS algorithm to meet the following criterion:

$$\min_{C_m^{(k)}} \sum_{k=0}^{N-1} |\tilde{Y}_m(k)C_m(k) - X_m(k)|^2 \quad \text{(formula 7)}$$

The updating rule then has the form $$C_{m+1}(k) = C_m(k) + \Delta\epsilon_m(k)\tilde{Y}_m^*(k) \quad \text{(formula 8)}$$

where $\Delta$ is a learning constant which is a positive real number and invariable during updating. $\epsilon_m(k) = P[\tilde{X}_m(k)] - \tilde{X}_m(k)$ and $\tilde{Y}_m^*(k)$ is the complex conjugate of $\tilde{Y}_m(k)$. The learning constant $\Delta$ is selected such that the term in formula (8) converges.

The linear phase error is compensated with the aid of the MMSE phase error compensation estimates of the phase errors $\bar{\theta}_{m-1}$ and $\bar{\theta}_{m-2}$ of the two preceding symbols, i.e.

$$\min_{\bar{\theta}_m} \sum_{k=0}^{N-1} |\hat{X}_m(k)e^{i\bar{\theta}_m} - X_m(k)|^2 \quad \text{(formula 9)}$$

Formula (9) enables the phase compensation term $\bar{\theta}_m$ to be solved, giving:

$$\bar{\theta}_m = \arg\left\{\frac{\sum_{k=0}^{N-1}P[\tilde{X}_m(k)]\hat{X}_m*(k)}{\sum_{k=0}^{N-1}|\hat{X}_m(k)|^2}\right\} \quad \text{(formula 10)}$$

where $\tilde{x}_m(k)$ is a demultiplexed, phase compensated sample equalized in the frequency domain and $\hat{x}_m(k)$ is a demultiplexed, non-phase compensated sample equalized in the frequency domain.

The required phase compensation for the nth sample of the mth symbol can be expressed as $$f_m(n) = a_m n + b_m \quad \text{(formula 11)}$$

where $$f_m(-(N/2+N_g)) = \bar{\theta}_{m-1} \quad \text{(formula 12)}$$

and $$f_m(-(3N/2+2N_g)) = \bar{\theta}_{m-2} \quad \text{(formula 13)}$$

where $N_g$ is the number of samples in guard interval. In other words, the phase correction is positioned at the center of each OFDM symbol, and thus constants a and b can be solved from the above equations as follows:

$$a_m = \frac{\bar{\theta}_{m-1} - \bar{\theta}_{m-2}}{N + N_g} \quad \text{(formula 14)}$$

and $$b_m = \frac{N(3\bar{\theta}_{m-1} - \bar{\theta}_{m-2}) + 2N_g(2\bar{\theta}_{m-1} - \bar{\theta}_{m-2})}{2(N + N_g)} \quad \text{(formula 15)}$$

Figure 2:
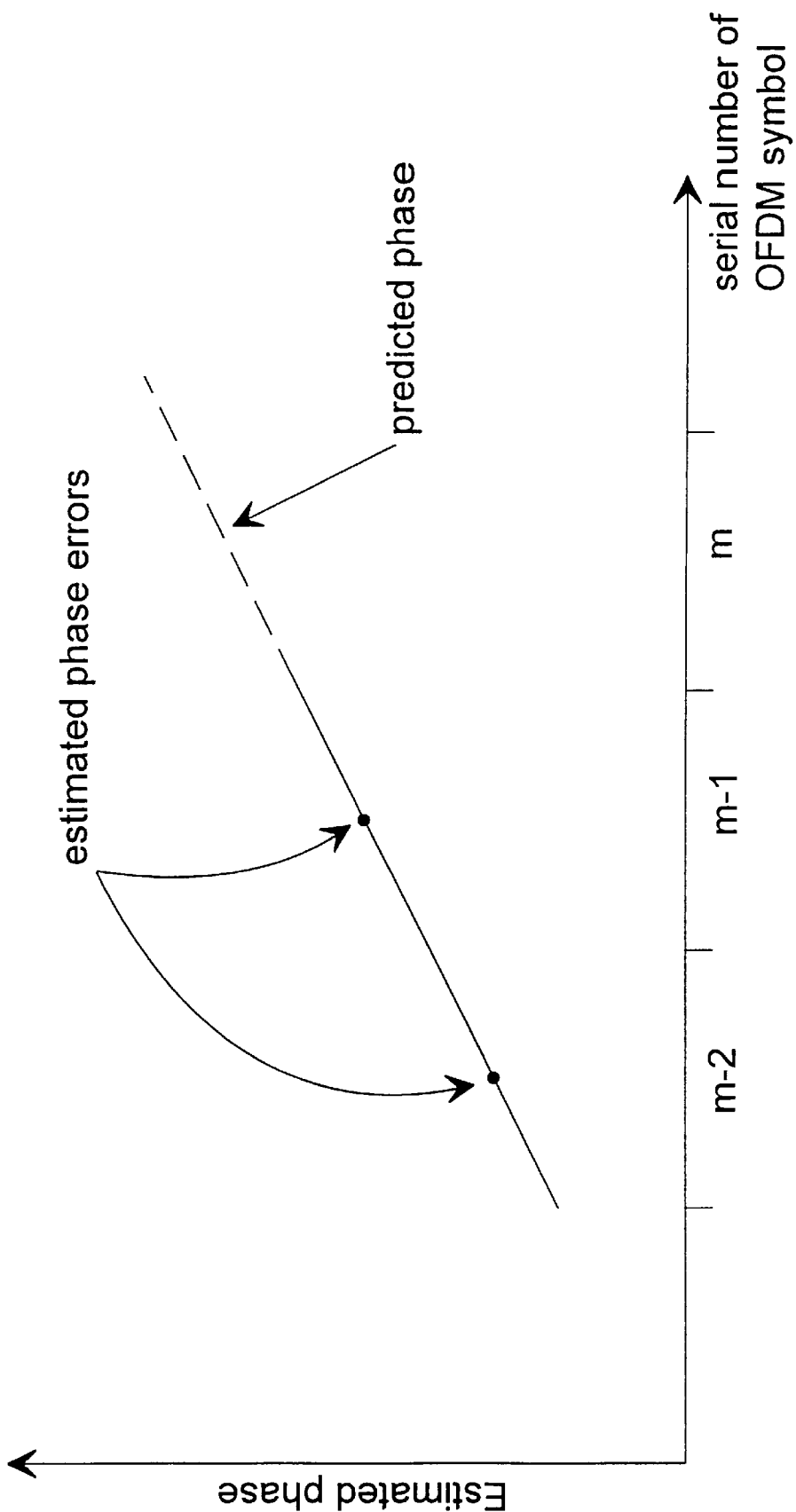
FIG. 2 illustrates the principle of compensating a linear phase distortion as a coordinate presentation and FIG. 3 illustrates a schematic block diagram of the device for compensating phase distortion in accordance with the invention.

The estimates of the phase correction angles $\bar{\theta}_{m-2}$ and $-\bar{\theta}_{m-1}$ have been defined such that offsets greater than $\pi$ are converted into corresponding $2\pi$ complements. FIG. 2 shows the principle of estimating phase offset.

The coefficient required in the phase compensation of the received nth sample of the mth symbol can now be expressed as follows:

$$t_{m,n} = e^{if_m(n)} = e^{ib_m} e^{ia_m n}, n = 0 \ldots N-1 \quad \text{(formula 16)}$$

In practical implementation this is best expressed with the following formula:

$$t_{m,n} = e^{ib_m} \prod_{p=1}^{n} e^{ia_m} \quad \text{(formula 17)}$$

Here N complex multiplying operations and two $e^{ix}$ operations will be necessary.

Figure 3:
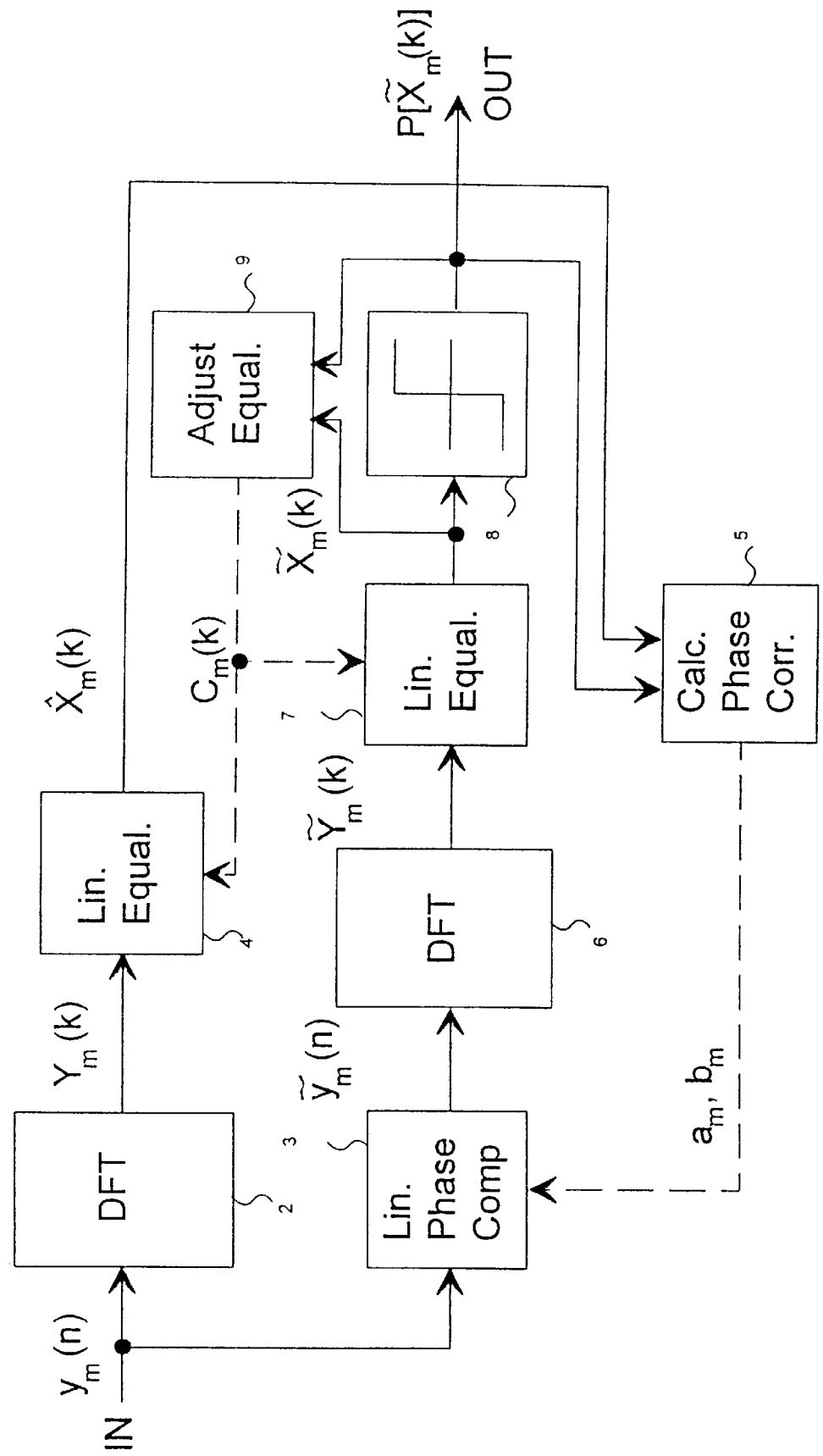

FIG. 3 shows a schematic block diagram of the device for compensating phase distortion of the invention. The received nth sample ym(n) of the mth symbol is conducted through the IN line of the device for compensating phase distortion to the first Discrete Fourier Transformer 2 and to the linear phase compensator 3. The Fourier-transformed signal $Y_m(k)$ is conducted to the first linear equalizer 4, where the Fourier-transformed signal $Y_m(k)$ is multiplied with coefficient $C_m(k)$ as in formula (5) so that the term $\tilde{X}_m(k)$ is equaled by the term $\hat{X}_m(k)$ and the term $\tilde{Y}_m(k)$ is equaled by the term $\hat{Y}_m(k)$. The output of the first linear equalizer 4 provides sampled signals. $\hat{X}_m(k)$ to be taken to the phase error calculator 5.

In the linear phase compensator 3 the phase of an input signal $Y_m(n)$ is compensated by means of the correction coefficients $a_m$, $b_m$ calculated in the phase error calculator 5 in accordance with the above formulas (4), (17). The signal $\tilde{y}_m(n)$ phase compensated in the time domain is conducted to a secondary Discrete Fourier Transformer 6, where the signal is transformed to the frequency domain. The signal $\tilde{Y}_m(k)$, transformed to the frequency domain and phase compensated, is taken to a second linear equalizer 7. In the second linear equalizer 7 the signal $\tilde{Y}_m(k)$ is multiplied with the coefficient $C_m(k)$ as in formula (5).

The signal $\tilde{X}_m(n)$ provided by the second linear equalizer 7 is taken both to the decision member 8 and to the correction coefficient updating member 9. The decision member 8 selects the system symbol corresponding next to the signal $\tilde{X}_m(n)$, this symbol thus corresponding to the output OUT of the equalizer 1. The selected symbol is also taken to the correction coefficient updating member 9 and the phase error calculator 5.

The invention can also be implemented such that the secondary Discrete Fourier Transformation $\tilde{Y}_m(n)$ (formula 6) is calculated for some subcarrier waves only. In this way, however, the phase error estimate will be less accurate and more subsceptible to noise, but in low noise cases the accuracy will be satisfactory.

Instead of time domain, phase noise compensation can be executed in frequency domain using convolution. In this case, the secondary Discrete Fourier Transformation 6 is replaced with a digital filter, thus allowing a less complex structure for equalizer 1.

The invention is not restricted to the above embodiments, but can be varied within the scope of the accompanying claims.

I claim:

1. A method for compensating channel errors in digital data communication of a signal in sampled data form, comprising the steps of:
   estimating phase error of an examined sample at least on a basis of phase errors of two preceding samples for providing an estimate, and
   using said estimate for compensating the phase error of the examined sample ($y_m(n)$).

2. Method as claimed in claim 1, wherein the step of estimating phase error is performed in the frequency domain.

3. Method as claimed in claim 2, wherein the step of compensating is performed in the time domain with inverse phase rotation.

4. Method as claimed in claim 1, wherein the step of compensating phase error of the examined sample is performed in two steps, a first step of compensating a linear part of the phase error in the time domain, and a second step of compensating the phase error in the frequency domain.

5. A method as claimed in claim 4, wherein the first step of compensating is done with the equation $\tilde{y}_m(n) = Y_m(n) t_{m,n}$, where $\tilde{Y}_m(n)$ = an nth phase compensated value of the mth symbol, $Y_m(n)$ = a received nth sample of the mth symbol, $t_{m,n}$ = a time equalizing term, and the second step of compensating is done with the equation $\tilde{X}_m(k) = \tilde{Y}_m(k) C_m(k)$, where $\tilde{X}_m(k)$ = an nth frequency compensated value of the mth symbol, $\tilde{Y}_m(k)$ = a Discrete Fourier Transformed sample of the phase compensated value ($\tilde{Y}_m(n)$), and $C_m(k)$ = a frequency coefficient.

6. Method as claimed in claim 5, wherein a compensated value (P) of the examined sample ($Y_m(n)$) is formed by selecting a symbol value available in the system next to a frequency compensated value ($\tilde{X}_m(k)$) provided in the second step of compensating.

7. Method as claimed in claim 6 wherein the frequency coefficient ($C_m(k)$) is iteratively solved by using a least mean square algorithm to meet the following criterion:

$$\min_{C_m(k)} \sum_{k=0}^{N-1} |\tilde{Y}_m(k) C_m(k) - X_m(k)|^2$$

a frequency coefficient calculated with the following equation being used to compensate a subsequent sample in the frequency domain:

$$C_{m+1}(k) = C_m(k) + \Delta \epsilon_m(k) \tilde{Y}_m^*(k)$$

where $\Delta$ = learning constant $\epsilon R^+$ able during updating and is selected such that the term in the formula immediately above converges, $$\epsilon_m(k) = P[\tilde{X}_m(k)] - \tilde{X}_m(k),$$

and $\tilde{Y}_m^*(k)$ is the complex conjugate of $\tilde{Y}_m(k)$.

8. Method as claimed in claim 6, in which a guard interval ($t_g$) is added to the symbol ($\chi_m(n)$) during transmission, wherein a time equalizing term ($t_{m,n}$) is calculated with an equation $$t_{m,n} = e^{if_m(n)} = e^{ib_m} e^{ia_m n}, n = 0 \ldots N-1$$

where $$a_m = \frac{\bar{\theta}_{m-1} - \bar{\theta}_{m-2}}{N + N_g}$$

$$b_m = \frac{N(3\bar{\theta}_{m-1} - \bar{\theta}_{m-2}) + 2N_g(2\bar{\theta}_{m-1} - \bar{\theta}_{m-2})}{2(N + N_g)}$$

$$\bar{\theta}_m = \arg\left\{\frac{\sum_{k=0}^{N-1} P[\tilde{X}_m(k)]\hat{X}_m*(k)}{\sum_{k=0}^{N-1} |\hat{X}_m(k)|^2}\right\}$$

$N_g$=a number of samples in a guard interval ($t_g$), and $N$=a number of samples of the examined symbol ($Y_m(n)$).

9. Method as claimed in claim 8 wherein the frequency coefficient ($C_m(k)$) is iteratively solved by using a least mean square algorithm to meet the following criterion:

$$\min_{C_m(k)} \sum_{k=0}^{N-1} |\tilde{Y}_m(k)C_m(k) - X_m(k)|^2$$

a frequency coefficient calculated with the following equation being used to compensate a subsequent sample in the frequency domain:

$$C_{m+1}(k) = C_m(k) + \Delta\epsilon_m(k)\tilde{Y}_m*(k)$$

where $\Delta$=learning constant $\epsilon R^+$ is invariable during updating and is selected such that the term in the formula immediately above converges, $$\epsilon_m(k) = P[\tilde{X}_m(k)] - \tilde{X}_m(k),$$

and $\tilde{Y}_m*(k)$ is the complex conjugate of $\tilde{Y}_m(k)$.

10. Method as claimed in claim 4, wherein a compensated value ($P[\tilde{X}_m(k)]$) of the examined sample ($Y_m(n)$) is formed by selecting a symbol value available in the system next to a frequency compensated value ($\tilde{X}_m(k)$) provided in the second step of compensating.

11. Method as claimed in claim 10, in which a guard interval ($t_g$) is added to the symbol ($x_m(n)$) during transmission, wherein a time equalizing term ($t_{m,n}$) is calculated with an equation $$t_{m,n} = e^{ifm(n)} = e^{ib_m}e^{ia_mn}, n=0\ldots N-1$$

where $$a_m = \frac{\bar{\theta}_{m-1} - \bar{\theta}_{m-2}}{N + N_g}$$

$$b_m = \frac{N(3\bar{\theta}_{m-1} - \bar{\theta}_{m-2}) + 2N_g(2\bar{\theta}_{m-1} - \bar{\theta}_{m-2})}{2(N + N_g)}$$

$$\bar{\theta}_m = \arg\left\{\frac{\sum_{k=0}^{N-1} P[\tilde{X}_m(k)]\hat{X}_m*(k)}{\sum_{k=0}^{N-1} |\hat{X}_m(k)|^2}\right\}$$

$N_g$=a number of samples in a guard interval ($t_g$), and $N$=a number of samples of the examined symbol ($Y_m(n)$).

12. Method as claimed in claim 11, wherein the frequency coefficient ($C_m(k)$) is iteratively solved by using a least mean square algorithm to meet the following criterion:

$$\min_{C_m(k)} \sum_{k=0}^{N-1} |\tilde{Y}_m(k)C_m(k) - X_m(k)|^2$$

a frequency coefficient calculated with the following equation being used to compensate a subsequent sample in the frequency domain:

$$C_{m+1}(k) = C_m(k) + \Delta\epsilon_m(k)\tilde{Y}_m*(k)$$

where $\Delta$=learning constant $\epsilon R^+$ is invariable during updating and is selected such that the term in the formula immediately above converges, $$\epsilon_m(k) = P[\tilde{X}_m(k)] - \tilde{X}_m(k),$$

and $\tilde{Y}_m*(k)$ is the complex conjugate of $\tilde{Y}_m(k)$.

13. Device (1) for compensating channel errors in digital data communication of a signal in sampled data form, the device (1) comprising:

means (2, 5, 6, 8) for estimating phase error of an examined sample ($Y_m(n)$, $\tilde{Y}_m(n)$) on the basis of phase errors of at least two preceding samples, and means (3, 4, 7, 9) for compensating the phase error of the examined sample ($Y_m(n)$, $\tilde{y}_m(n)$).

14. Device (1) as claimed in claim 13, wherein the means (2, 5, 6, 8) for estimating the phase error of the examined sample ($Y_m(n)$, $\tilde{Y}_m(n)$) includes means (2) for transforming the examined sample ($Y_m(n)$, $\tilde{Y}_m(n)$) to the frequency domain.

15. Device as claimed in claim 13, wherein the means (3) for compensating the phase error of the examined sample ($Y_m^{(n)}$, $\tilde{Y}_m^{(n)}$) includes means for transposing the examined sample ($Y_m^{(n)}$, $\tilde{Y}_m^{(n)}$) in the time domain.

* * * * *

UNITED STATES PATENT AND TRADEMARK OFFICE
CERTIFICATE OF CORRECTION

PATENT NO : 5,987,063
DATED : November 16, 1999
INVENTOR(S): J. Rinne

It is certified that error appears in the above-identified patent and that said Letters Patent are hereby corrected as shown below:

At col. 6, line 31, please cancel "(P)" and substitute --$(P[\tilde{X}_m(k)])$,-- therefor; and at line 51, please cancel "able" and substitute --is invariable-- therefor.

Signed and Sealed this

Third Day of April, 2001

Attest:

NICHOLAS P. GODICI

Attesting Officer

Acting Director of the United States Patent and Trademark Office